United States Patent

Keller

[11] Patent Number: 5,803,666
[45] Date of Patent: Sep. 8, 1998

[54] HORIZONTAL DRILLING METHOD AND APPARATUS

[76] Inventor: Carl E. Keller, P.O. Box 9827, Santa Fe, N. Mex. 87504

[21] Appl. No.: 769,656

[22] Filed: Dec. 19, 1996

[51] Int. Cl.$^6$ ................. E21D 11/00; F16L 1/00
[52] U.S. Cl. ............ 405/146; 405/150.1; 405/154
[58] Field of Search ................... 405/154, 156, 405/146, 128, 150.1, 151, 129, 184; 175/53, 314; 156/294, 287; 264/40.3, 269, 516

[56] References Cited

U.S. PATENT DOCUMENTS

| | | | |
|---|---|---|---|
| 2,927,775 | 3/1960 | Hildebrandt | 255/72 |
| 3,168,924 | 2/1965 | Anderson | 175/314 |
| 3,927,164 | 12/1975 | Shimaburkuro | 156/294 X |
| 4,064,211 | 12/1977 | Wood | 264/95 |
| 4,522,125 | 6/1985 | Marz | 102/313 |
| 4,680,066 | 7/1987 | Wood | 156/156 |
| 4,770,562 | 9/1988 | Muller et al. | 405/154 |
| 4,785,885 | 11/1988 | Cherrington et al. | 175/53 X |
| 5,169,264 | 12/1992 | Kimura | 405/146 X |
| 5,176,207 | 1/1993 | Keller | 166/64 |
| 5,375,668 | 12/1994 | Hallundback | 175/52 |
| 5,377,754 | 1/1995 | Keller | 166/264 |
| 5,466,093 | 11/1995 | Keller | 405/152 |

Primary Examiner—Dennis L. Taylor
Attorney, Agent, or Firm—Ray G. Wilson

[57] ABSTRACT

A bore hole support system is formed from a flexible liner that is readily everted within and inverted from a bore hole and forms a bore hole support system during installation of a casing for the bore hole. After a pilot hole is drilled, the pilot hole is traversed with a reamer to form the pilot hole diameter to a larger diameter for the final bore hole. The flexible liner is everted and pressurized behind the reamer as the reamer traverses the pilot hole to support walls defining the bore hole. The flexible liner may also be used to assist in installation of the casing and well screen. The liner is further extended beyond an entrance location from the bore hole a distance approximating the horizontal bore hole length. A casing is then fixed within the flexible liner, and the flexible liner is inverted back through the bore hole to draw the casing through the bore hole while the casing is enclosed within the flexible liner. The flexible liner is further inverted to remove the flexible liner from about the casing and from within the bore hole.

14 Claims, 7 Drawing Sheets

HORIZONTAL DRILLING METHOD AND APPARATUS

BACKGROUND OF THE INVENTION

This invention relates to drilling horizontal bore holes, and, more particularly, to stabilizing horizontal borehole walls.

Many uses arise for horizontal bore holes, particularly in the field of environmental remediation where a geologic structure must be followed for contaminant monitoring and removal. There are several considerations relative to drilling horizontal bore holes. A first consideration is forming the bore hole itself, i.e., drilling the passage through the earth. A second consideration is the support of the bore hole walls. Next, as the hole is drilled, the bore hole cuttings must be removed from the bore hole. The final consideration is the installation of a casing and a well screen within the bore hole.

In conventional drilling, a drilling mud is circulated around a drill bit in order to flush the cuttings from the drill from the hole. The drilling mud is commonly formed of a composition that will form a mud cake on the bore hole wall and support the bore hole walls against collapse. Drilling mud exerts pressure against the hole wall, which then supports the wall. If the drilling mud cannot support the hole wall, the walls will collapse and greatly impede emplacement of the casing and any well screen provided with the casing. The drilling mud may also serve as a lubricant during installation of the casing and well screen, but the casing and screen can experience significant drag forces during installation that can deform and damage the screen.

In drilling horizontal holes for remediation of contaminated geologic formations, however, the drilling mud acts to plug the pore space of the formation. The plugging effect of the drilling mud drastically reduces the permeability of the geologic formation to fluid flow into or out of the hole. The plugging effect is especially pronounced in loosely consolidated sands and gravel that are often the preferred flow paths of contaminates in the geologic structure.

It will also be appreciated that the drilling muds that effectively support the bore hole walls also circulate very slowly in large diameter bore holes. This slow circulation velocity reduces the effectiveness of the drilling mud to remove the drill cuttings from the bore hole.

Accordingly, it is an object of the present invention to provide an alternate means for supporting the wall of a bore hole during horizontal drilling.

It is another object of the present invention to avoid the buildup of mud cake on the bore hole wall and improve the removal of cuttings out of the bore hole.

Yet another object of the present invention is to enable a relatively low viscosity fluid to be circulated during drilling operations to remove cuttings from the bore hole.

One other object of the present invention is to reduce the forces on the hole casing and well screen during emplacement in the bore hole.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a bore hole support system. A flexible liner defines a generally cylindrical shape with an interior and an exterior when everted and has distal and proximal ends. A canister houses the liner in an inverted condition. A first cord is connected to the distal end of the liner and extends through the interior of the liner to the canister for inverting the liner. A second cord connects to the distal end of the liner and extends along the exterior of the liner to the canister for everting the liner.

In a second aspect of the present invention, there is provided a method for enlarging and supporting a bore hole. An everting liner system is provided at an exit location from a pilot hole. The pilot hole is traversed with a reamer to form the pilot hole diameter to a larger diameter for the final bore hole. The liner system is everted and pressurized behind the reamer as the reamer traverses the pilot hole to support walls defining the bore hole.

In yet another aspect of the present invention, there is provided a method for encasing a horizontal bore hole. An everting liner system is provided at an exit location from a pilot hole. The pilot hole is traversed with a reamer to form the pilot hole diameter to a larger diameter for the final bore hole. The liner system is everted and pressurized behind the reamer as the reamer traverses the pilot hole to support walls defining the bore hole with a flexible liner. The flexible liner is further extended beyond an entrance location from the pilot hole a distance approximating the horizontal bore hole length. A casing is then fixed within the flexible liner, and the flexible liner is inverted back through the bore hole to draw the casing through the bore hole while the casing is enclosed within the flexible liner. The flexible liner is further inverted to remove the flexible liner from about the casing and from within the bore hole.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
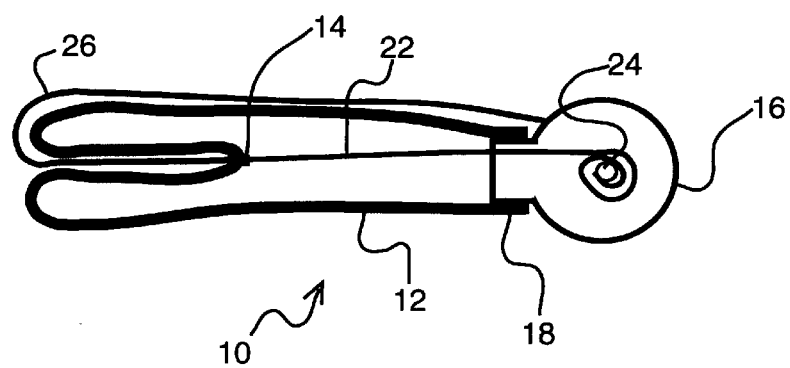
FIG. 1 is a pictorial illustration of an everting bore hole liner according to one embodiment of the present invention.

In accordance with the present invention, the bore hole wall support function of drilling mud is replaced with an everting flexible bore hole liner. As shown in FIG. 1, a suitable flexible bore hole liner system 10 is formed from a flexible liner 12 sealed at its distal end 14 and attached to an enclosing reel canister 16 at proximal end 18 of flexible liner 12. In an exemplary embodiment, flexible liner 12 is inverted within canister 16 by winding cord-like member 22 onto reel 24. Everting liner systems are well known and are not, per se, the subject of the present invention. Everting liner systems are shown in U.S. Pat. Nos. 5,176,207, issued Jan. 5, 1993; 5,377,754, issued Jan. 3, 1995; and 5,466,093, issued Nov. 14, 1995, all incorporated herein by reference.

Figure 2:
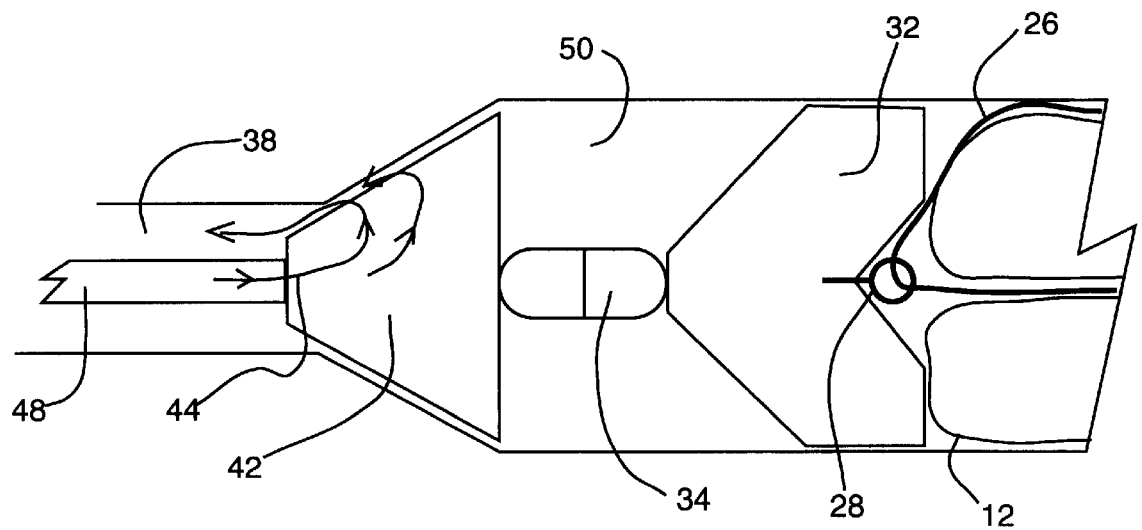
FIG. 2 is an illustration in cross-section of a system for forming a final bore hole using an everting liner.

In accordance with one aspect of the present invention, as shown in FIGS. 1 and 2, a second cord-like member 26 is fixed to distal end 14 of liner 12 and passes about the exterior of liner 12 to proximal end 18 of liner 12. As shown in FIG. 1, the proximal end of cord 26 is fixed to canister 16. Cord 26 can now be pulled to assist in everting liner 12 from a canister to increase the number of applications for using everting liner systems.

In a particular application, described below, a generally rigid member 32, hereinafter called a "pig", includes an attachment point 28, which may be a bolt eyelet, pulley, or the like, through which cord 26 passes to assist in everting liner 12. As pig 32 is moved through a bore hole, as hereinafter explained, eyelet 28 pulls cord 26 as cord 26 slides through eyelet 28 and everts liner 12 from canister 16. Pig 32 is generally a conical/cylindrical shape and further includes a second attachment point 34 for attaching to a drill string component.

Figure 3:
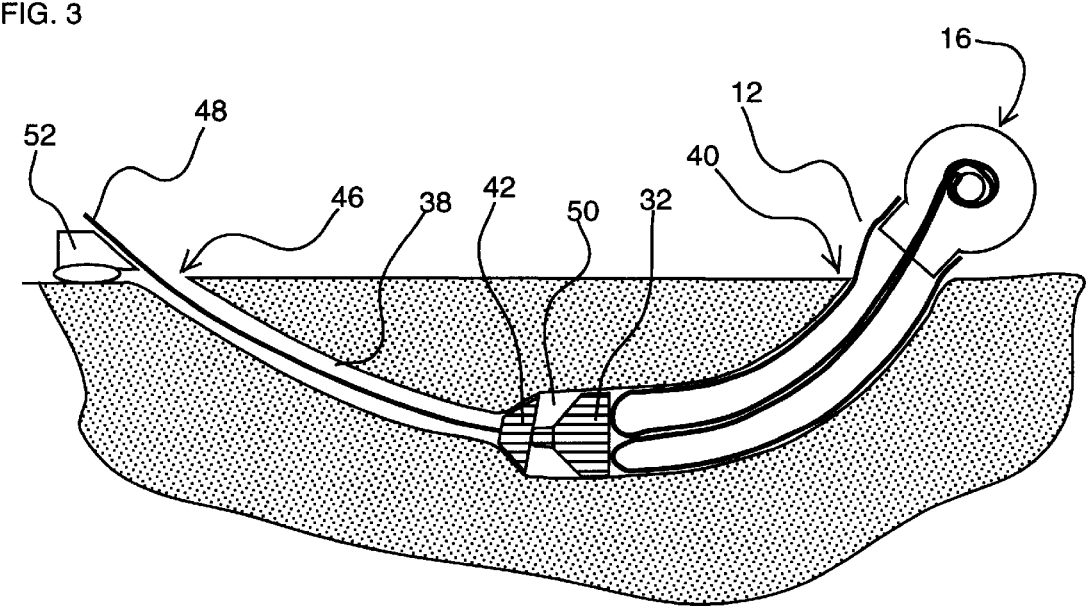
FIG. 3 is a pictorial illustration of the bore hole system shown in FIG. 2 during bore hole formation.

FIGS. 2 and 3 further illustrate the installation of flexible liner 12 within a bore hole. Pilot hole 38 is formed conventionally with entrance end 46 and exit end 40. Pilot hole 38 is typically small (2–5 inches in diameter) and is formed by driving a steerable bit (not shown) through the earth to exit end 40. Drilling fluids are injected through the bit to support the wall of pilot hole 38 and to remove drill cuttings from the hole as the cuttings are generated.

When pilot hole 38 is completed, drill stem 48 extends through end 40 and reaming drill bit 42 is attached to the end of drill stem 48. In accordance with the present invention, pig 32 is attached to reamer 42 by connection 34, which is preferably a rotatable connection so that pig 32 does not rotate as rotated to form a bore hole to the desired final diameter. Drill stem 48 is rotated by drill rig 52 and pulled back through pilot hole 38 as reamer 42 is rotated and drawn through pilot hole 38. Thus, reamer 42 draws pig 32 through enlarged hole 50, which, in turn, pulls cord 26 and everts liner 12 into enlarged bore hole 50.

Liner 12 may be pressurized by a fluid, e.g., water, to maintain the advancing end of liner 12 in contact with pig 32 as reamer 42 reams out pilot hole 38. Pressurized everting liner 12 supports and seals the wall of bore hole 50 formed by reamer 42. The pressure in liner 12 is controlled to be greater than the pressure of drilling fluid that is circulating around reamer 42. Thus, the flow of drilling fluid in pilot hole 38 is forced to flow along the pilot hole surrounding drill stem 48 and can be maintained at a relatively high flow rate to remove cuttings generated by reamer 42 through hole entrance 46. Further, with liner 12 inflated within enlarged bore hole 50, the drilling fluid does not flow into the enlarged hole and cannot form a mud cake on the wall of the enlarged final hole.

The everting, inflated liner 12 supports the wall of the enlarged bore hole 50, prevents mud cake formation on the enlarged hole wall 50, reduces the drilling fluid injection into the medium outside enlarged hole 50, improves cutting removal via pilot hole 38 and also prevents cuttings from settling out of the drilling fluid, which would otherwise flow more slowly in the enlarged bore hole.

Figure 4:
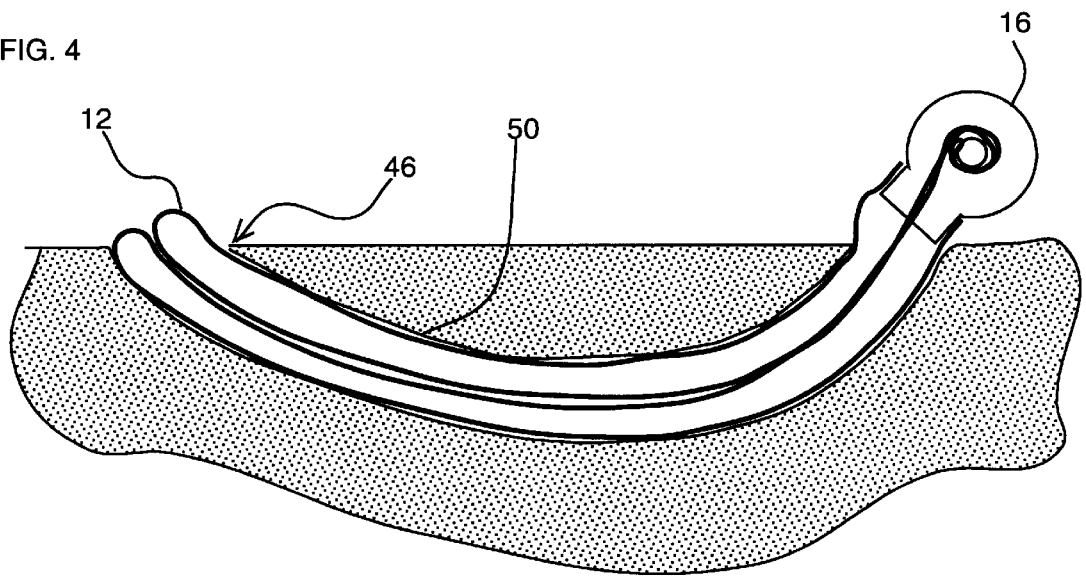
FIG. 4 is a pictorial illustration of the completed bore hole supported by an everted liner.

FIG. 4 illustrates a completed bore hole 50 and liner 12 everted from canister 16 through entrance hole 46. The drill string consisting of pig 32, reamer 42, drill pipe 48, and drill rig 52 (FIG. 3) is now disconnected from liner 12 and removed for installation of the hole casing and screen.

Figure 5:
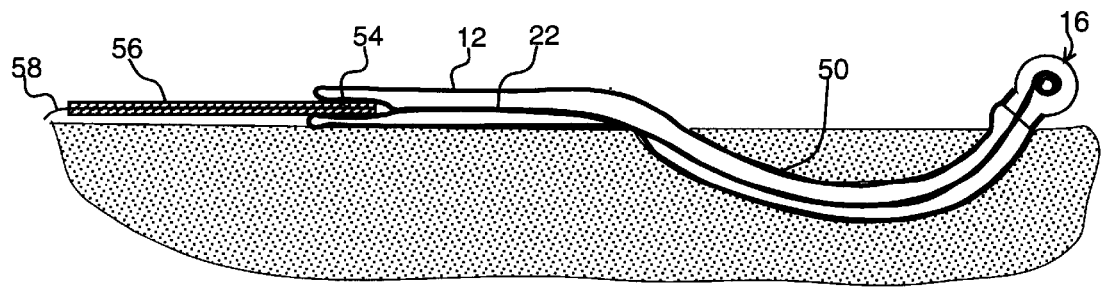
FIG. 5 is a pictorial illustration of an extended everted liner connecting with a hole casing.

As shown in FIG. 5, liner 12 is further everted out of bore hole 50 and extended a distance equal to the length of bore hole 50. Exit end 54 of casing string 56 is inserted into the distal end of liner 12 and reel 24 (FIG. 1) is rotated to retract cord 22 within canister 16. As cord 22 is retracted, the distal end of flexible liner 12 retracts and the friction between liner 12 and casing 56 clamps casing 56 within pressurized liner 12 whereby inverting liner 12 draws casing 56 within bore hole 50. In a preferred embodiment, a fluid pipe 58 is placed within casing 56 to force water from exit end 54 of casing 56 and between casing 56 and the inverted portion of liner 12, as explained below.

Figure 6:
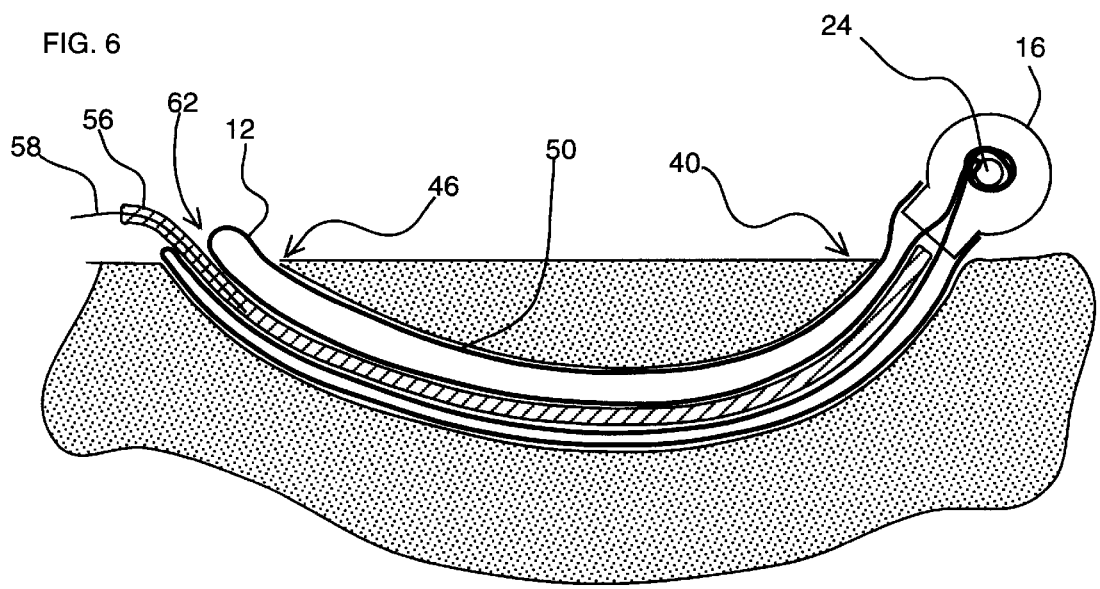
FIG. 6 is a pictorial illustration of a bore hole casing that has been pulled through the bore hole by the liner.
Figure 7:
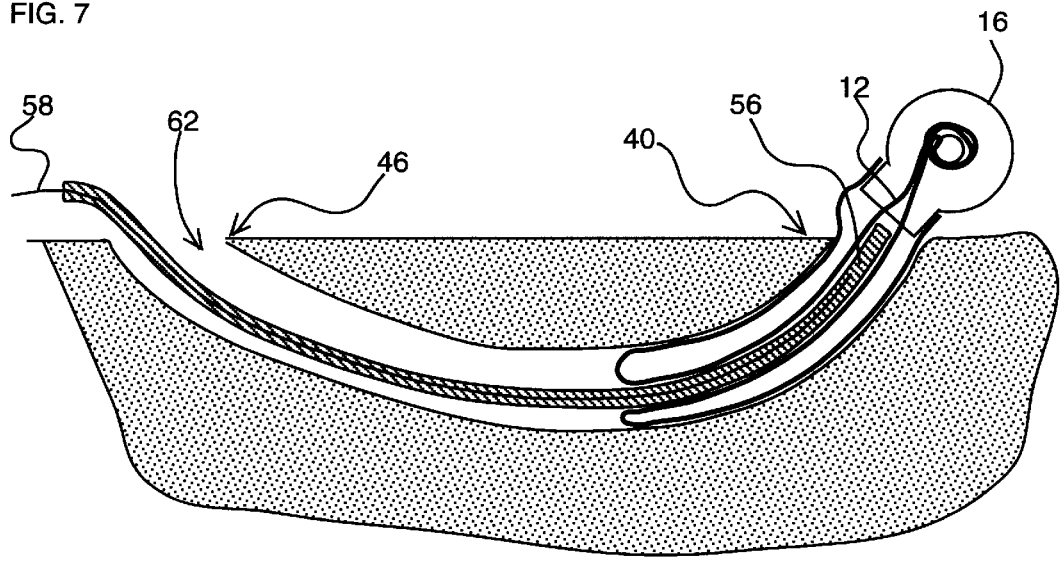
FIG. 7 is a pictorial illustration of the liner being inverted from around the inserted bore hole casing.

FIGS. 6 and 7 illustrate casing 56 fully drawn through bore hole 50, through exit 40 and encased inside the inverted liner 12 and interior to the portion of pressurized liner 12 that is supporting and contacting the wall of bore hole 50. Casing 56 is now anchored at the end extending from entrance 46 and exterior to end 62 of liner 12. A fluid flow, usually water, is then started through fluid pipe 58 and the fluid flows from the end of casing 56 within liner 12 and between casing 56 and the inverted portion of liner 12. The fluid pressure forces liner 12 away from casing 56 to reduce the friction therebetween. When the fluid flow is fully established, reel 24 is rotated to completely invert liner 12 from within bore hole 50 and from around casing 56. It will be understood that the fluid within liner 12 is conventionally released by a pressure relief valve or the like (not shown) as liner 12 is inverted into canister 16.

As pressurized liner 12 is inverted, the wall of bore hole 50 is no longer supported and the walls may collapse around casing 56 so that casing 56 has been encased within bore hole 50. Portions of casing 56 may include long sections of well screen to enable fluid communication between the interior of casing 56 and the geologic structure enclosing casing 56. The effect of the flexible liner in the installation of casing 56, with or without a well screen, is to drastically reduce the friction in installing the well casing against a bore hole wall and to thereby essentially eliminate the usual tensile load of emplacing a casing by pulling it into an unsupported hole. The overall result is to allow the emplacement of screened horizontal wells in unconsolidated media without affecting the flow properties of the surrounding media.

As described above, friction between the flexible liner and the casing is reduced during inverting of the flexible liner by flowing water into the casing so that the water exits between the casing and the liner to force the liner away from the casing. But if the casing includes one or more well screen sections, there will be insufficient pressure differential to move the flexible liner from contact with the casing. In these instances, a second flexible liner is preferably used along the interior of the casing to maintain a continuous flow path for the water flow.

Figure 8:
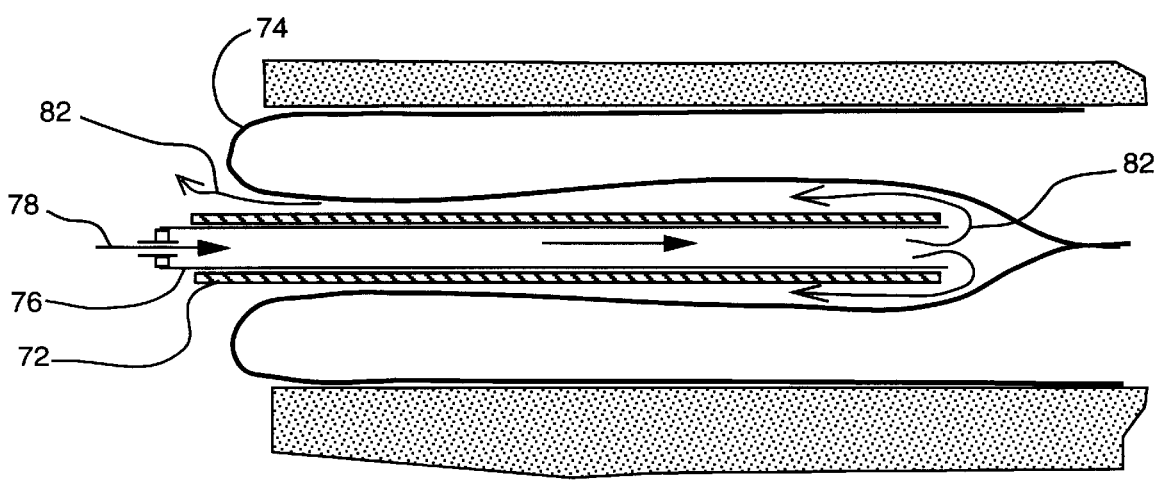
FIG. 8 is a pictorial illustration of the use of a second liner to facilitate removal of the installation liner from about the casing.

In one embodiment, shown in FIG. 8, flexible casing liner 76 is simply everted within casing 72 and water inlet 78 introduces water within casing liner 76 to hold casing liner 76 against the interior wall of casing 72 to prevent leakage of the water through the well screens and to establish water flow 82 between the outer wall of casing 72 and flexible bore hole liner 74 so that bore hole liner 74 is moved away from the surface of casing 72. It will be appreciated that casing liner 76 may be a relatively thin material since it is supported by casing 72 and there is little pressure differential across liner 76.

Figure 9:
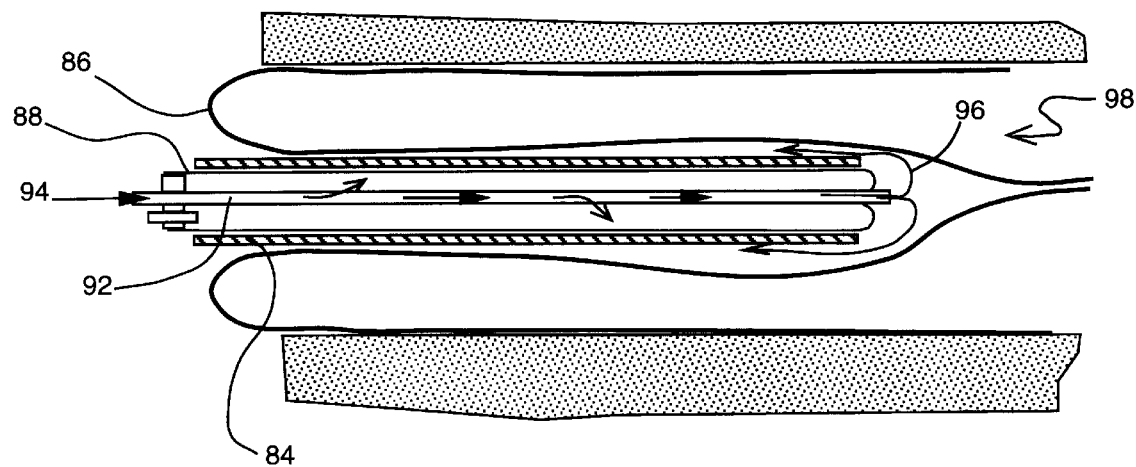
FIG. 9 is a pictorial illustration of another embodiment for using a second liner to facilitate removal of the installation liner from about the casing.

A second embodiment is shown in FIG. 9, where casing liner 88 includes a water tube 92 within everted liner 88 so that water flow 94 is introduced through the distal end of casing liner 88 and out of casing 84. Water tube 92 is preferably perforated inside casing liner 88 to pressurize casing liner 88 to seal any casing screens along casing 84. A water flow 96 is established to force bore hole flexible liner 86 away from the exterior surface of casing 84 as flexible liner 86 is inverted from within bore hole 98.

Figure 10:
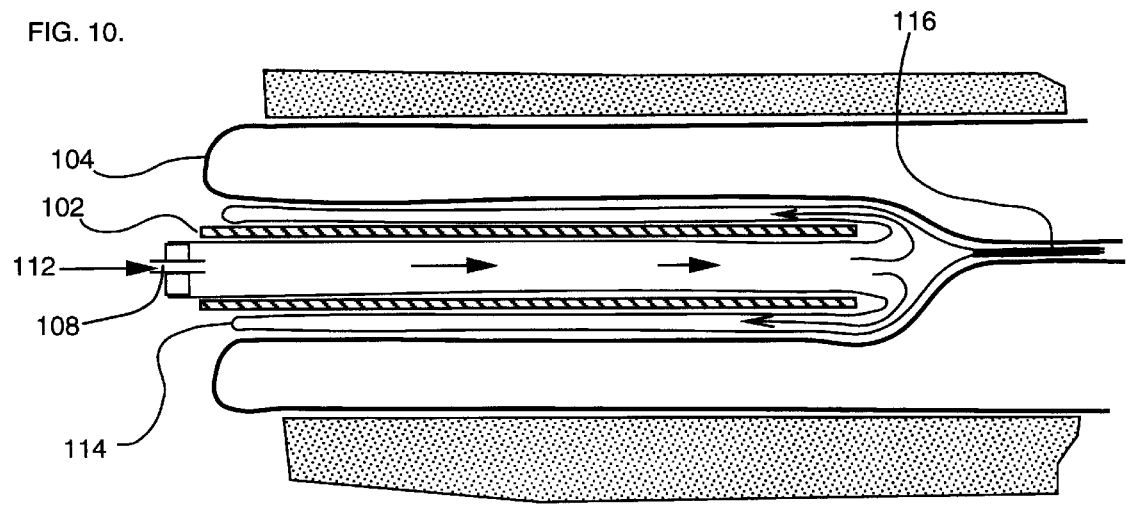
FIG. 10 is a pictorial illustration of a third embodiment for using a second liner to facilitate removal of the installation liner from about the casing.

FIG. 10 depicts a casing liner embodiment that provides the greatest reduction in the force needed to invert flexible bore hole liner 104. Casing liner 114 is sealed at its distal end 116, which is captured by bore hole flexible liner 104 when casing 102 is captured. A double layer of liner 114 lies along the surface of casing 102 while a portion of liner 114 seals the interior of casing 102. Liner 114 is sealed at the entrance to casing 102 with water inlet 108, casing 102 is then lined with liner 114 to force water out of the end of casing 102, but the exiting water is contained within liner 114 to prevent the exiting water from entering the borehole. Injected water 112 still acts to minimize friction between casing 102 and borehole liner 104.

Figure 11:
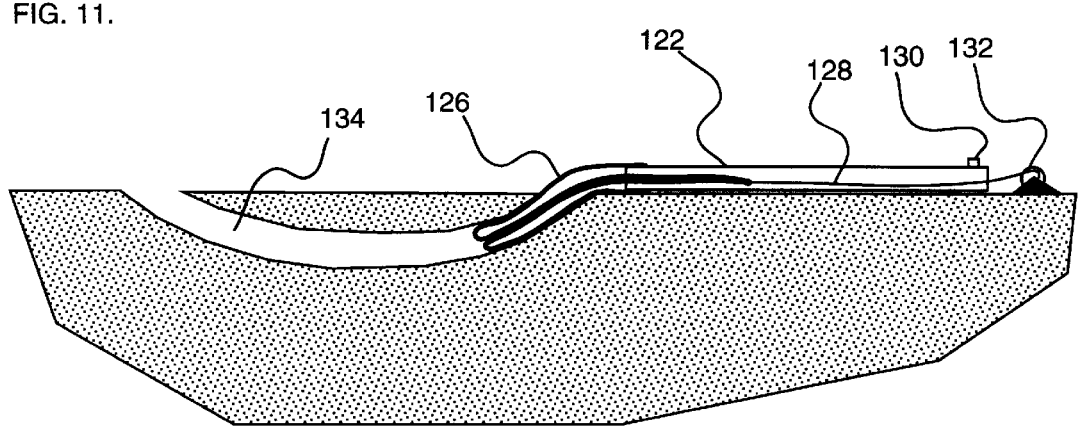
FIG. 11 depicts the installation of a liner with linear canister storage.

While the above description is directed to use of a reel-type everting liner, a long horizontal hose canister 122 shown in FIG. 11 may be used in place of the reel, if sufficient space if available. Horizontal hose canister 122 may be used in a horizontal position, as shown in FIG. 11, or may be used in an inclined position. Everting liner 126 may be pressurized through fitting 130 so that line 128 is unreeled from reel 132 external to canister 122 to evert liner 126 within bore hole 134. If canister 122 is inclined, liner 126 may evert without the need for pressurization. The overall operation for emplacing a casing in a bore hole is not changed significantly.

Figure 12:
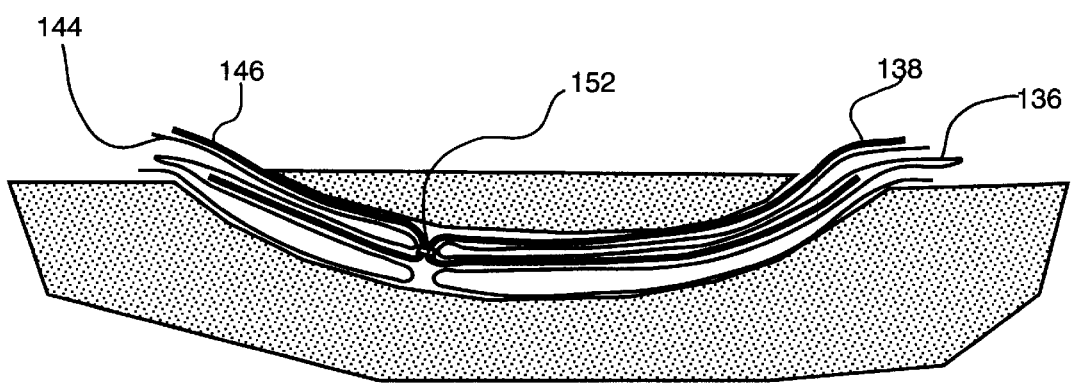
FIG. 12 depicts the use of a first liner to assist in the installation of a second liner.

The primary application of the everting liner according to the present invention is for bore hole casing installation, but the improved everting liner described above with reference to FIG. 1 has a number of applications once liner 12 has been installed within and supports a bore hole wall. In one alternate application, shown in FIG. 12, the casing is replaced with a second everting liner 144 having an external cord 146 for assisting in eversion of the liner. The two external cords 146 and 138 may be connected by a ring 152 or other suitable slidable attachment so that inversion of first liner 136 assists in eversion of the second liner 144 back through the enlarged bore hole. The second liner may include sensors as described in U.S. Pat. No. 5,176,207 to sample and measure the properties of the formation and entrained contaminants. Likewise, the primary everting liner may be equipped with sensors for monitoring the condition of the bore hole as it is enlarged. In a particular application, the liner is formed from a transparent material and a television camera is advanced with the distal end of the everting liner to monitor the liner as it expands against the drilling fluid pressure or to observe the properties of the geologic medium as the bore hole advances.

Figure 13:
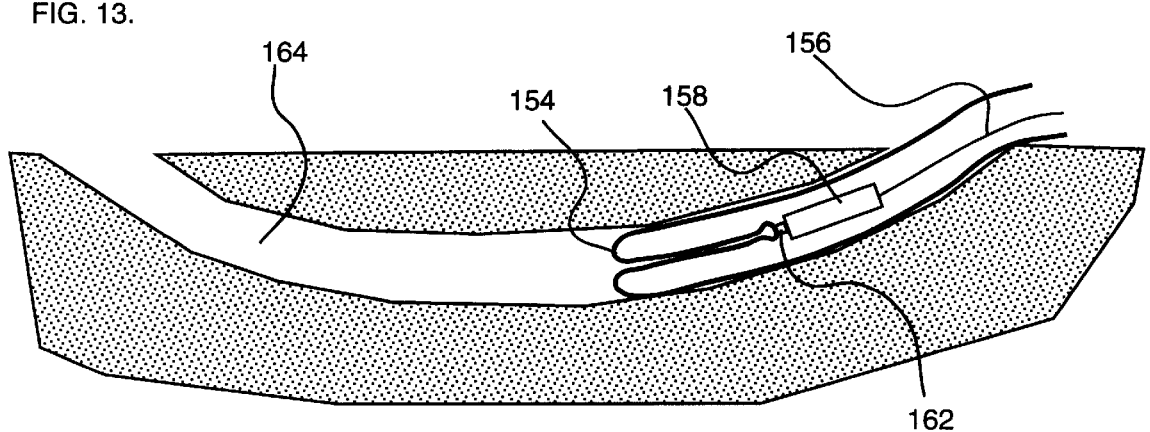
FIG. 13 depicts the use of a liner to carry instrumentation and the like through the bore hole.

In another alternate application shown in FIG. 13, logging sonde 158, of a number of known types, may be connected to the distal end 162 of liner 154, and moved through bore hole 164 as liner 154 is everted. Cable 156 may then serve as the electrical cable for sonde 158 and also as the inverting tether for liner 154. In this manner, bore 164 may be logged at the same time as casing is being installed.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A support system for supporting a horizontal bore hole having a known length during installation of a casing comprising:

a flexible liner defining a generally cylindrical shape with an interior and an exterior when everted and having distal and proximal ends, wherein said flexible liner has a length at least twice said length of said bore hole to support said bore hole along a first length when fully everted within said bore hole and a second length to grip and surround said casing as said casing is installed within said bore hole and said first length of said liner;

a canister for housing said liner in an inverted condition;

a first cord connected to said distal end of said liner and extending through said interior of said liner to said canister for inverting said liner; and a second cord connected to said distal end of said liner and extending along said exterior of said liner to said canister for everting said liner.

2. A bore hole support system according to claim 1, further including a pig slideably attached to said second cord for moving through said bore hole in advance of said flexible liner while everting said flexible liner within said bore hole.

3. A bore hole support system according to claim 2, further including a reamer attached to said pig for enlarging a diameter of a precursor pilot hole for said bore hole to a desired diameter for said bore hole.

4. A method for enlarging and supporting a bore hole having an inlet end and an exit end, comprising the steps of:

forming a pilot hole along a path for said bore hole to define said inlet end and said exit end:

extending a drill string through said pilot hole:

providing an everting liner system at said exit end; traversing said pilot hole from said exit end to said inlet end with a reamer attached to said drill string to form said pilot diameter to a diameter for said bore hole; and everting and pressurizing said liner system behind said reamer as said reamer traverses said pilot hole from said exit end to said inlet end to support walls defining said bore hole.

5. A method according to claim 4, wherein the step of everting said liner system includes the step of attaching said liner system to said reamer effective to assist said everting of said liner system as said reamer traverses said pilot hole.

6. A method according to claim 5, further including the step of inserting a pig between said reamer and said everting liner system, said pig having a rotatable connection with said reamer and a slidable connection with said flexible liner.

7. A method for encasing a horizontal bore hole, comprising the steps of:

provided an everting liner system at an exit location from a pilot hole;

traversing said pilot hole with a reamer to form said pilot diameter to a diameter for said bore hole;

everting and pressurizing said liner system behind said reamer as said reamer traverses said pilot hole to support walls defining said bore hole with a flexible liner;

extending said flexible liner beyond an entrance location from said pilot hole a distance approximating said horizontal bore hole;

fixing a casing within said flexible liner;

inverting said flexible liner back through said bore hole to draw said casing through said bore hole while said casing is enclosed within said flexible liner; and continuing to invert said flexible liner to remove said flexible liner from about said casing so that wall of said bore hole collapse about said casing to encase said bore hole walls.

8. A method according to claim 7, further including the step of flowing a fluid between said casing and said flexible liner to reduce friction while removing said flexible liner from about said casing.

9. A method according to claim 8, further including the steps of:

installing within said casing a second flexible liner adapted for placing within said casing; and placing a fluid within said second flexible liner to seal fluid movement along said casing to said bore hole.

10. A system for emplacing a casing within a borehole having a known length comprising:

a first flexible liner defining a generally cylindrical shape with an interior and an exterior when everted within a bore hole and having distal and proximal ends and a length at least twice said length of said bore hole to support said bore hole along a first length when fully everted within said bore hole and a second length to grip and surround said casing as said casing is installed within said bore hole and said first length of said liner; and a second flexible liner adapted for placing within said casing and having a fluid inlet for placing a fluid within said casing and between said first flexible liner and said casing.

11. A bore hole casing emplacement system according to claim 10, wherein said second flexible liner is closed and said fluid inlet includes a perforated tube extending within said second flexible liner for introducing a fluid to urge said second liner against said casing and connected for introducing said fluid between said first flexible liner and said casing.

12. A bore hole casing emplacement system according to claim 10, wherein said second flexible liner has a length about three times the length of said casing so that one end of said second flexible liner is captured by said first flexible liner to form a closed volume between said first flexible liner and said casing, wherein fluid injected through said fluid inlet forms a lubricating volume between said first flexible liner and said casing to assist in removing said first flexible liner from about said casing.

13. A bore hole liner emplacement system comprising:

a first flexible liner defining a generally cylindrical shape with an interior and an exterior when everted and having distal and proximal ends and having a first inverting cord connected to said distal end of said first liner and extending through said interior of said first liner for inverting said first liner and a first everting cord connected to said distal end of said first liner and extending along said exterior of said first liner for everting said first liner;

a second flexible liner defining a generally cylindrical shape with an interior and an exterior when everted and having distal and proximal ends and having a second inverting cord connected to said distal end of said second liner and extending through said interior of said second liner for inverting said second liner and a second everting cord connected to said distal end of said second liner and extending along said exterior of said second liner for everting said second liner; and a connector slidably connecting said first and second everting cords so that said said first flexible liner everts as said second flexible liner inverts and said first flexible liner inverts as said second flexible liner everts.

14. A bore hole liner emplacement system according to claim 13, further including instrument means in said first or second flexible liners for monitoring said borehole as said first or second flexible liner is everted through said bore hole.

* * * * *